2,948,685
BORE CLEANING COMPOSITIONS

Earl E. Fisher, Glenolden, Pa., assignor to Gulf Oil Corporation, Pittsburgh, Pa., a corporation of Pennsylvania No Drawing. Filed June 4, 1954, Ser. No. 434,643

4 Claims. (Cl. 252—118)

This invention relates to bore cleaning compositions adapted to remove, and/or to neutralize the harmful action of corrosive primer residues and moisture which are found in the bores of firearms after firing.

I have found that a highly satisfactory bore cleaning composition is produced by incorporating in a mineral oil diluent from about 1 to about 15 percent by weight of water, from about 0.25 to about 2.5 percent by weight of an alkanolamine selected from the group consisting of primary, secondary or tertiary alkanolamines whose alkanol substituents contain from 2 to 3 carbon atoms, from about 0.75 to about 10.0 percent by weight of a fatty acid containing from 12 to 24 carbon atoms, the fatty acid:alkanolamine mol ratio being in excess of 1:1, from about 0.1 to about 1.0 percent by weight of an amine salt of an aliphatic amine containing from 8 to 18 carbon atoms and a dialkyl orthophosphoric acid, the alkyl substituents of which contain from 3 to 10 carbon atoms, from about 1 to about 5 percent by weight of an alkali metal salt of an oil-soluble sulfonic acid, from about 2 to about 15 percent by weight of a coupling agent selected from the group consisting of butanol, 2-butoxyethanol and diethylene glycol monobutyl ether, and from about 1 to about 10 percent by weight of ethylene glycol.

In preparing the foregoing composition the components may be admixed in any order. Blending of the components is preferably carried out at room temperature but the process can be expedited by the use of elevated temperatures below the boiling point of the lowest boiling component of the mixture. Blending of the components may be facilitated at all suitable temperatures by the use of previously formed solutions of the individual additive agents, other than water, in a portion of the mineral oil diluent.

The principal components of the composition, from the standpoint of the external functioning thereof, comprise the mineral oil diluent and the water. As indicated, the latter is employed in the composition in amounts ranging from about 1 to about 15 percent by weight. In general, the water content of the composition may serve as a guide to the optimum concentrations for the other components of the composition. Thus, the mineral oil diluent content desirably varies inversely, and the other components' concentrations vary directly, as does the water content of the composition. Although compositions containing percentages of water in the upper portion of the permissible range possess a somewhat greater total capacity for water-soluble or water-dispersible contaminants, compositions containing intermediate or lower proportions of water are normally preferred since such mixtures tend to exhibit greater stability, with regard to separation of the aqueous and oil phases. The water employed in the composition may be ordinary tap water, if desired, although distilled water is normally preferred since the capacity of the latter for dissolution of water-soluble contaminants is somewhat greater than that of tap water. Although it is an important function of the water in the composition to dissolve water-soluble contaminants such as the corrosive residues of explosive primers, the water may also function in part as a carrier for dispersed contaminants.

The mineral oil diluent employed in the composition may be one having substantial volatility at room temperature, such as, for example, petroleum naphtha, mineral spirits (a petroleum solvent having a boiling range of about 150° to 200° C.), hexane, heptane or kerosene, or it may be one having no volatility at such temperatures, such as, for example, lubricating oil distillates having viscosities ranging from 50 to 3500 SUS at 100° F., or the mineral oil diluent may comprise mixtures including both types of oils in varying proportions. The substantially nonvolatile oils are employed in the composition when, and to the extent that, it is desired to provide a lasting, protective film in the bore of the firearm. Where lubricating distillates of relatively high viscosities are utilized, it is normally desirable to reduce the over-all viscosity of the composition by blending into the latter the necessary proportion of a light hydrocarbon oil diluent of the above indicated type. The mineral oil diluent forms the largest single portion of the composition and is present in amounts ranging from about 41.5 percent by weight to about 93.9 percent by weight. The mineral oil diluent functions as a solvent for the predominantly lipophilic materials in the composition, as the external or continuous phase in which the aqueous material is dispersed, and as a solvent or dispersant for oil-soluble or oil-dispersible residues in the bores of firearms cleaned with the composition. As previously indicated, the substantially nonvolatile lubricating oil component of the composition in addition functions to provide a protective film of some permanence in the bores of firearms treated with the composition.

The composition has incorporated therein from about 0.25 to about 2.5 percent by weight of a primary, secondary or tertiary alkanolamine whose alkanol substituents contain from 2 to 3 carbon atoms. Examples of alkanolamines included by the invention are monoethanolamine, diethanolamine, triethanolamine and diisopropanolamine. The alkanolamine component is considered to react with the excess of fatty acid that is incorporated in the composition to form, in situ, an alkanolamine soap, of which triethanolamine oleate and stearate are considered illustrative. Although these alkanolamine soaps possess appreciable lipophilic properties, owing to the acidic portion of the molecule, the hydrophilic properties imparted to the soap by the alkanol substituents thereof tend to predominate. The alkanolamine soap functions as an emulsifying agent and assists in maintaining the stability of the composition over a wide range of temperatures. The surface-active characteristics of the alkanolamine soaps also promote the wetting properties of the composition.

The composition additionally has incorporated therein from about 0.75 to about 10.0 percent by weight of a fatty acid containing from 12 to 24 carbon atoms per molecule. The concentration of the fatty acid is such as to provide a fatty acid:alkanolamine mol ratio in the composition that is in excess of 1:1. Examples of fatty acids included by the invention are n-dodecanoic acid, stearic acid, oleic acid, linoleic acid and tetracosanoic acid. Fatty acids that are liquid at room temperature, such as oleic acid, are preferred in order to facilitate blending at room temperature. However, as heretofore indicated blending at room temperature of normally solid fatty acids may be expedited by previously dissolving the same in a small amount of the mineral oil diluent. The free fatty acid in the composition functions as a lipophilic co-emulsifier and has a marked beneficial effect upon the stability of the composition.

The bore cleaning composition further contains from about 1 to about 5 percent by weight of an alkali metal salt of an oil-soluble sulfonic acid. The class of alkali metal salts of oil-soluble sulfonic acids is well known and includes salts of oil-soluble aliphatic hydrocarbon sulfonic acids containing 8 carbon atoms per molecule, such as, for example, the higher molecular weight naphthene sulfonic acids, and alkyl substituted aromatic hydrocarbon sulfonic acids whose alkyl substituents contain at least 8 carbon atoms, such as the higher molecular weight alkyl benzene sulfonic acids, e.g., the wax alkyl benzene sulfonates. Commercial mixtures of alkali metal salts of oil-soluble sulfonic acids, such as sodium petroleum sulfonate, are especially suitable for the purposes of this invention. Such salts have average molecular weights ranging from about 450 to about 650 and are prepared by neutralization of petroleum sulfonic acids resulting from sulfuric acid treatment of lubricating oil distillates. These salts and their preparation are known in the art and need not be discussed in detail. The alkali metal hydrocarbon sulfonate functions in the composition as a strongly hydrophilic co-emulsifying agent. The herein disclosed sulfonates are also considered to act as solubilizing agents for the alkanolamine soaps, maintaining a high degree of solubility for the latter over a wide range of temperatures. The alkali metal sulfonates further impart rust inhibiting properties to the composition.

The composition further contains from about 0.1 to about 1.0 percent by weight of an amine salt of a primary aliphatic amine containing from 8 to 18 carbon atoms per molecule and a dialkyl orthophosphoric acid, the alkyl substituents of which contain from 3 to 10 carbon atoms. Representative examples of amine salts included by the invention are the n-octyl, n-dodecyl, n-octadecyl and n-octadecenyl amine salts of di-n-propyl, di-n-amyl, di-n-capryl and isoamyl isooctyl orthophosphoric acids. The amine salts of commercial amine mixtures, such as cocoamine, a mixture containing predominantly lauryl amine together with lesser amounts of homologous alkyl amines containing from 8 to 18 carbon atoms per molecule, are suitable for the purposes of this invention. This component possesses lipophilic characteristics and imparts rust and corrosion inhibiting properties to the composition. The foregoing amine salts, or alkylammonium dialkyl orthophosphates, also possess surface-active properties and act as stabilizing agents in the composition.

The composition further contains from about 2 to about 15 percent by weight of a coupling agent or common solvent for oil and water selected from the group consisting of butanol, 2-butoxyethanol and diethylene glycol monobutyl ether. Each of these compounds possesses an influential butyl group (for oil-water miscibility) and an influential hydroxyl group (for water miscibility) in the molecule and accordingly promotes the miscibility of the water and the oil, thereby increasing the stability of the composition against separation.

The composition further contains ethylene glycol as a low temperature stabilizer. The identity of the low temperature stability agent is important, since numerous other materials having analogous properties and otherwise compatible with the other components of this composition in the proportions disclosed herein have been found ineffective from the standpoint of stability and/or fluidity at low temperatures, flash point, or other properties.

The foregoing components coact in the proportions indicated to provide an apparently homogeneous, bright, liquid bore cleaning composition having remarkable stability against separation over a wide range of temperatures, having superior cleaning characteristics, and free from offensive odors. The homogeneity and exceptional stability of the composition are attributed to the cooperative action of the emulsifying agents, stabilizing agents and other additive components, in the proportions indicated, to provide the hydrophilic-lipophilic balance that is necessary to maintain the particle size of the dispersed aqueous phase at a size sufficiently small (usually less than about 0.05µ) to provide a "bright" or transparent solution. The term "solution" is used in its normal broad sense to indicate either a true solution, or a colloidal solution or emulsion.

The utility of the bore cleaning compositions of this invention may be more clearly understood by reference to the following illustrative specific examples.

EXAMPLE I

The following compositions, compositions A, B, C and D, were prepared by admixture of the components listed below, in the concentrations indicated, at room temperature and with agitation.

| Description | A<br>Percent by weight | B<br>Percent by weight | C<br>Percent by weight | D<br>Percent by weight |
|---|---|---|---|---|
| Light lubricating distillate | 32.0 | 32.0 | 32.0 | 32.0 |
| Mineral spirits | 36.0 | 36.0 | 36.0 | 36.0 |
| Triethanolamine | 1.7 | 1.7 | 1.7 | 1.7 |
| Oleic acid | 9.0 | 9.0 | 9.0 | 9.0 |
| Cocoamine salt of 2-ethylhexyl,3-methylbutyl o-phosphoric acid (84% solution) | 0.3 | 0.3 | 0.3 | 0.3 |
| Sodium petroleum sulfonate | 3.5 | 3.5 | 3.5 | 3.5 |
| Butanol | 7.5 | 7.5 | 7.5 | 12.5 |
| Water | 5.0 | 5.0 | 5.0 | 5.0 |
| Ethylene glycol | 5.0 | | | |
| Diethylene glycol monobutyl ether | | 5.0 | | |
| 2-butoxyethanol | | | 5.0 | |

In admixing the foregoing components the oleic acid was added last until the mixture became bright. The light lubricating distillate employed in the foregoing compositions was a low-viscosity lubricating distillate derived from a Coastal type crude oil. A typical sample of this oil had an API gravity of 23.5°, a viscosity of 107.0 SUS at 100° F., 38.3 SUS at 210° F., a flash point (open cup) of 315° F., a fire point (open cup) of 355° F. and a Conradson carbon residue of 0.06 percent. The cocoamine salt referred to was employed in a lubricating oil solution containing 84 percent by weight of said salt.

Each of the foregoing compositions was subjected to the low temperature fluidity test procedure described in Joint Army-Navy Specifications JAN-C-372, dated July 30, 1946. Briefly, this test involves maintaining the composition at —20° F. for 24 hours. At the end of this period the composition is examined for haze, stratification and/or solidification. The results of this test as applied to compositions A, B, C and D are indicated in the table below.

Table 1

| Composition | A | B | C | D |
|---|---|---|---|---|
| Low temperature fluidity: Inspection—After 24 Hrs. at —20° F. (JAN-C-372). | Bright-liquid. | Congealed. | Congealed. | Congealed. |

The results set forth in the foregoing table demonstrate the unique suitability of compositions of the type of composition A with respect to low temperature fluidity and stability characteristics.

EXAMPLE II

Composition A, described in detail in Example I, was further subjected to the performance test procedure set forth in Joint Army-Navy Specifications JAN-C-372. Briefly, this test is carried out by firing a .30 caliber cartridge, assembled with a primer of the corrosive chlorate type but without powder or bullet, at the center of a test panel formed from low carbon steel. The test panel is thoroughly cleaned and dried prior to the test. The cartridge is fired at an angle of 45° to the test panel and at a distance of 1 inch therefrom. After firing the test cartridge, the panel is cleaned with a cloth patch that has been saturated with the bore cleaning composition, using a gentle swabbing motion. This treatment is followed by further swabbing, first with a clean dry patch, and then with a clean patch that has been saturated with the bore cleaning composition. The thus-cleaned test panel is then placed in a humidity cabinet maintained at 100 percent relative humidity and at 100° F. for 3 days. At the end of this period the test panel should show no evidence of rust or corrosion. The result of the foregoing test is indicated below.

Table 2

| Composition | A |
|---|---|
| Inspection: Corrosion after 72 hours at 100° F. (JAN-C-372). | Bright-passes. |

The foregoing data clearly demonstrate the utility of the herein disclosed compositions. In addition to the properties indicated above, these compositions are alkaline to litmus, show exceptional stability following repeated and/or protracted exposures to high and low temperature extremes, possess a flash point within the required range, and leave no solid or tacky residue upon evaporation.

Other suitable bore cleaning compositions can be prepared similarly as in the foregoing examples by substitution of other components from the herein disclosed classes of materials, either in the same proportions, or in proportions disclosed as equivalent to those set forth above. If desired, the composition may include other agents that do not interfere appreciably with the functions of the foregoing components, in order to improve one or more of its properties.

Numerous modifications of the herein disclosed compositions may be resorted to without departing from the spirit of the invention. Accordingly, the invention is limited only by the scope of the claims appended hereto.

I claim:

1. A bore cleaning composition comprising a mineral oil and incorporated therein from about 1 to about 15 percent by weight of water, and a sufficient amount to provide a homogeneous, bright solution of a combination of from about 0.25 to about 2.5 percent by weight of an alkanolamine selected from the group consisting of primary, secondary and tertiary alkanolamines whose alkanol substituents contain from 2 to 3 carbon atoms, 0.75 to about 10.0 percent by weight of a fatty acid containing from 12 to 24 carbon atoms, the fatty acid:alkanolamine mol ratio being in excess of 1:1, from about 0.1 to about 1.0 percent by weight of an amine salt of a primary aliphatic amine containing from 8 to 18 carbon atoms and a dialkyl orthophosphoric acid, the alkyl substituents of which contain from 3 to 10 carbon atoms, from about 1 to about 5 percent by weight of an alkali metal salt of an oil-soluble sulfonic acid, and from about 2 to about 15 percent by weight of a coupling agent selected from the group consisting of butanol, 2-butoxyethanol and diethylene glycol monobutyl ether, and an amount of ethylene glycol sufficient to render the composition stable at —20° F. for 24 hours, said amount being from about 1 to about 10 percent by weight.

2. A bore cleaning composition comprising a mineral oil and incorporated therein from about 1 to about 15 percent by weight of water, and a sufficient amount to provide a homogeneous, bright solution of a combination of from about 0.25 to about 2.5 percent by weight of triethanolamine, from about 0.75 to about 10.0 percent by weight of oleic acid, from about 0.1 to about 1.0 percent by weight of the cocoamine salts of 3-methylbutyl, 2-ethylhexyl orthophosphoric acid, from about 1 to about 5 percent by weight of sodium petroleum sulfonate, and from about 2 to about 15 percent by weight of butanol and an amount of ethylene glycol sufficient to render the composition stable at —20° F. for 24 hours, said amount being from about 1 to about 10 percent by weight.

3. A bore cleaning composition comprising a mineral oil and incorporated therein from about 1 to about 15 percent by weight of water, from about 0.25 to about 2.5 percent by weight of triethanolamine, the weight ratio of triethanolamine to water being about 0.34:1, from about 0.75 to about 10.0 percent by weight of oleic acid, the weight ratio of oleic acid to water being about 1.8:1, from about 0.1 to about 1.0 percent by weight of the cocoamine salt of 3-methylbutyl, 2-ethylhexyl orthophosphoric acid, the weight ratio of the cocoamine salt of 3-methylbutyl, 2-ethylhexyl orthophosphoric acid to water being about 0.6:1, from about 1 to about 5 percent by weight of sodium petroleum sulfonate, the weight ratio of sodium petroleum sulfonate to water being about 0.70:1, from about 2 to about 15 percent by weight of butanol, the weight ratio of butanol to water being about 1.5:1, and from about 1 to 10 percent by weight of ethylene glycol, the weight ratio of ethylene glycol to water being about 1:1.

4. A bore cleaning composition comprising a major amount of mineral oil and having incorporated therein about 5 parts by weight of water, about 1.7 parts by weight of triethanolamine, about 9 parts by weight of oleic acid, about 0.3 parts by weight of the cocoamine salt of 3-methylbutyl, 2-ethylhexyl orthophosphoric acid, about 3.5 parts by weight of sodium petroleum sulfonate, about 7.5 parts by weight of butanol and about 5.0 parts by weight of ethylene glycol.

References Cited in the file of this patent

UNITED STATES PATENTS

| 2,032,174 | Johnson | Feb. 26, 1936 |
| 2,403,619 | Skinner | July 9, 1946 |
| 2,413,852 | Turner | Jan. 7, 1947 |
| 2,466,632 | Borus | Apr. 5, 1949 |
| 2,763,614 | Cantrell et al. | Sept. 18, 1956 |

OTHER REFERENCES

Chemical Formulary, D. Van Nostrand Co., N.Y., vol. 2 (1935), p. 69.

Chemical Formulary, D. Van Nostrand Co., N.Y., vol. 3 (1936), p. 333.

Emulsions, Booklet of Carbide and Carbon Chem. Corp., N.Y., 5th ed. (1936), pp. 40–41.